US005341270A

United States Patent [19]

[11] Patent Number: 5,341,270

Kaczmarek

[45] Date of Patent: Aug. 23, 1994

[54] DROP RESISTANT CUP-ARRESTER ASSEMBLY

[75] Inventor: Richard T. Kaczmarek, Chicago, Ill.

[73] Assignee: Reliance COMM/TEC Corporation, Chicago, Ill.

[21] Appl. No.: 960,950

[22] Filed: Oct. 14, 1992

[51] Int. Cl.[5] .......................... H02H 3/22; H02H 9/04

[52] U.S. Cl. .................................... 361/119; 361/124; 361/127

[58] Field of Search ............... 361/118, 119, 120, 124, 361/127, 728–730, 744, 752, 823, 824

[56] References Cited

U.S. PATENT DOCUMENTS 4,241,374 12/1980 Gilberts ............................... 361/119
4,901,188 2/1990 Gilberts ............................... 361/119
4,939,619 7/1990 Borkowicz et al. ................ 361/117

*Primary Examiner*—Jeffrey A. Gaffin
*Assistant Examiner*—Ronald W. Leja
*Attorney, Agent, or Firm*—Trexler, Bushnell, Giangiorgi & Blackstone, Ltd.

[57] ABSTRACT

An arrester assembly for arresting over-voltage conditions in electric circuits and for isolating an arrester element from possibly harmful effects of external forces applied to the arrester assembly comprises a hollow cup and an arrester element located within the cup for arresting over-voltage conditions. A plastic sleeve is disposed within the cup surrounding the arrester element for isolating the arrester element from the possibly harmful effects of external forces applied to the assembly. A spring may also be provided within the cup for further isolating the arrester element from such effects.

12 Claims, 2 Drawing Sheets

FIG. 1
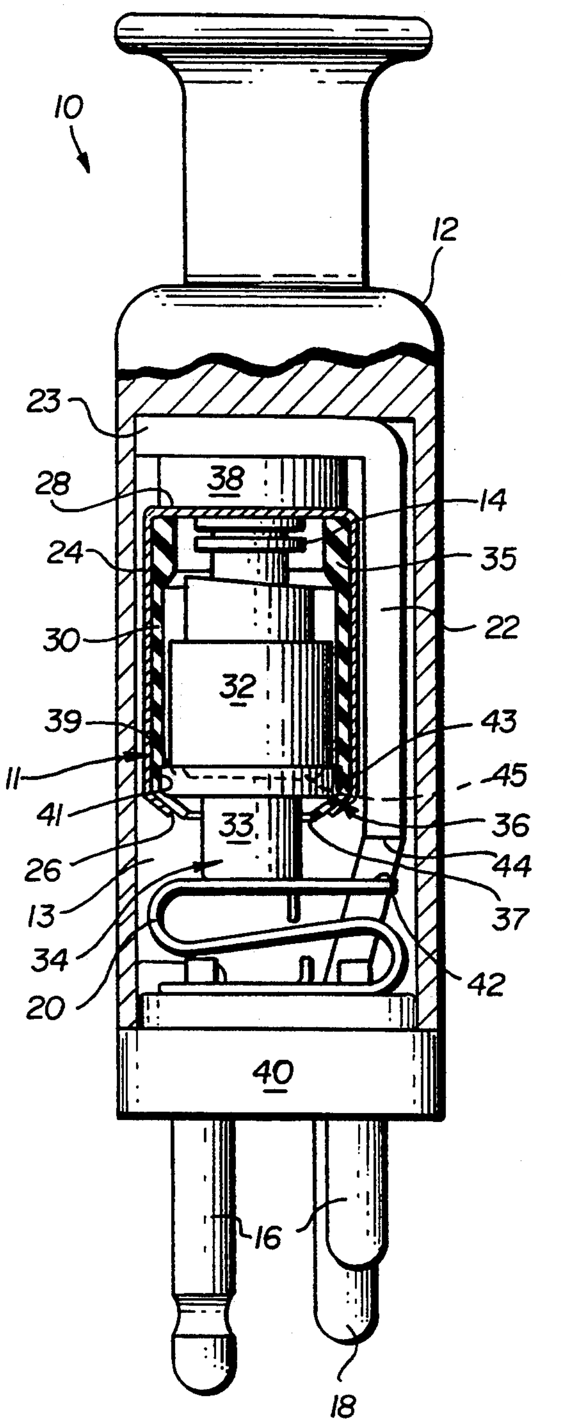
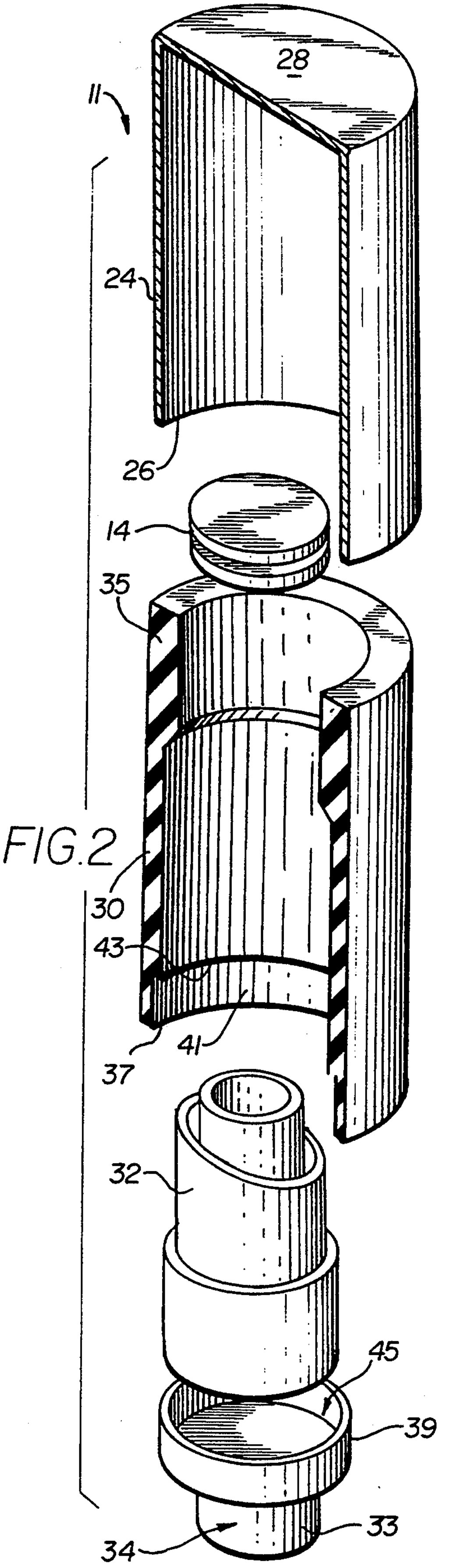
FIG. 2

DROP RESISTANT CUP-ARRESTER ASSEMBLY

BACKGROUND OF THE INVENTION

The present invention relates generally to an arrester assembly of novel construction for shunting over-current and over-voltage conditions present in an electrical circuit. More specifically, the invention relates to a novel cup-arrester assembly which meets a relevant industry drop impact test or standard.

The construction and operation of over-current and over-voltage arresters are well known in the relevant art. Because these arresters are necessary to protect sensitive telecommunications and related electronic equipment, such as computer modems, facsimile machines and the like, from over-voltage and over-current conditions on telecommunications lines, these arresters are quite important.

Arresters are often relatively small elements of various constructions, ranging from gas tube to carbon air gap to solid state types. The arresters are electrically connected at some point in a telecommunications line between a signal source and a piece of equipment. In this manner, it is hoped that any over-voltage or over-current conditions present in the line will encounter an arrester and be shunted to ground, thereby preventing those conditions from reaching and adversely affecting or damaging the equipment. However, the arresters must be undamaged and otherwise functionally intact in order to perform properly, as intended.

Because attesters are often relatively small in size, they can be easily dropped during manufacture and transport, or by a workman during installation. When an arrester is dropped, external forces generated upon impact of the arrestor with a surface can irreparably damage the arrester. For example, a semiconductor or solid state arrester element may fracture under the influence of the external, impact generated forces, thereby preventing the element from functioning properly. This damage is often not easily detected. This lack of detection can result in a damaged arrester being mistakenly installed. A damaged arrestor may not properly shunt over-current and/or over-voltage conditions to ground.

In an effort to minimize the possibility that a damaged, not fully functional arrester would be mistakenly installed in a circuit, there has been devised a drop impact test for arresters. Under the conditions of this test, an arrester is dropped from a height of approximately five feet onto a hard surface. The arrester is then tested to determine if it has been damaged by the forces generated by the impact with the surface. If the arrester passes the drop impact test, the arrester should be able to properly function. The novel cup-arrester assembly, constructed according to the teachings of the present invention, is intended to pass this drop impact test.

OBJECTS AND SUMMARY OF THE INVENTION

A general object of the present invention is to provide a novel cup-arrester assembly.

A more specific object of the invention is to provide a cup-arrester assembly of novel construction which provides sufficient protection to an arrester element for allowing the arrester element to survive intact the effects of external forces applied to the assembly.

Another object of the present invention is to provide a cup-arrester assembly which passes a relevant industry drop impact test.

A novel cup-arrester assembly, constructed according to the teachings of the present invention, for isolating an arrester element from the effects of external forces applied to the assembly, comprises a hollow cup and an over-voltage arrester element located within the cup. A plastic sleeve is disposed within the cup surrounding the arrester element for isolating said arrester element from the effects of external forces applied to said assembly. A spring may also be provided within the cup for further isolating the arrester element from the effects of external forces applied to the assembly.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is a side elevational view of a cup-arrester assembly, constructed according to the teachings of the present invention, housed in a standard 5-pin protector module with a portion thereof broken away to reveal the novel construction of the cup-arrester assembly;

FIG. 2 is an enlarged exploded sectioned perspective view of the cup-arrester assembly shown in FIG. 1;

DETAILED DESCRIPTION OF THE ILLUSTRATED EMBODIMENTS

Figure 3:
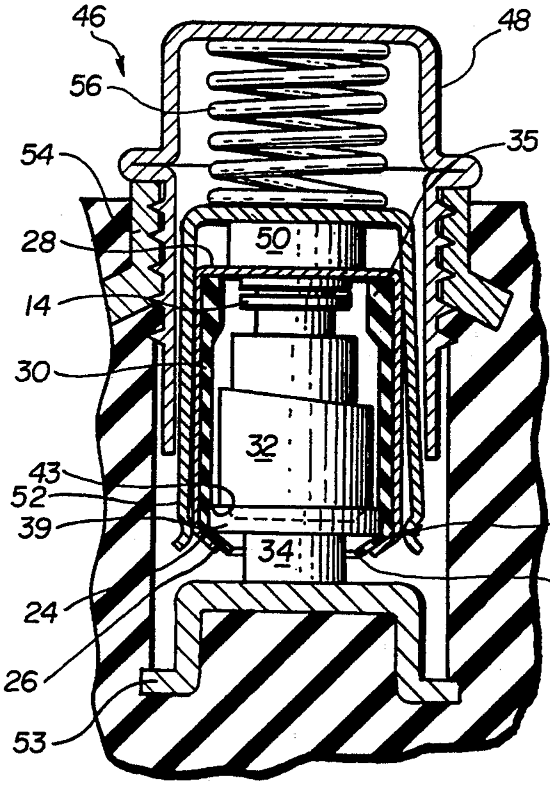
FIG. 3 is a partially sectioned side elevational view of the cup-arrester assembly of FIG. 2 encased in a standard screw-in protector module.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring initially to FIG. 1, an over-voltage and over-current arrestor 10, including a drop resistant cup-arrester assembly 11, constructed according to the teachings of the present invention, is shown contained in a standard 5-pin protector module 12. The module 12 has a chamber 13 therein of dimensions sufficient for housing the assembly 11. The assembly 11 is constructed for isolating an arrester element 14 from possibly harmful effects of external forces applied thereto or to the module 12. Accordingly, the assembly 11 provides an improvement over the arresters of the prior art, such as the attester which is the subject matter of the co-pending U.S. patent application Ser. No. 07/715,418, of Kaczmarek, assigned to the assignee of the present invention.

While the assembly 11 is shown in the drawings and will be discussed in detail hereinbelow with reference to its employment with a solid state over-voltage arrester element 14, it is to be understood that the assembly 11 can be successfully employed with other types of over-voltage and over-current attester elements, such as gas and/or carbon elements, without departing from the scope of the invention. Also, while the assembly 11 is shown and will be discussed with respect to its use in certain types of housings or protector modules, it is also to be noted that the assembly 11 can be used in a number of differently configured housings or protector modules without departing from the scope of the invention.

In FIG. 1, one assembly 11 is visible inside the chamber 13, but it is to be noted that, in the 5-pin module 12, there are usually two such assemblies 11 disposed side-by-side within the chamber 13. Thus, the construction of the arrester 10 will be discussed with relation to only one of the assemblies 11. The protector 12 is constructed substantially similarly to the protector which is the subject matter of U.S. Pat. No. 4,901,188 to Gilberts, which has been assigned to the assignee of the present invention. The disclosure of this Gilberts patent is incorporated herein by reference. The protector 12 generally comprises five depending contact pins including line pins 16 and a ground pin 18 for forming electrical connections between the arrester 10 and a complementary socket, not shown, in well known, plug-in fashion. The line pins 16 are electrically connected to electrically conducting, substantially S-shaped springs 20, one of which being visible in FIG. 1. Accordingly, the spring 20 forms an electrical extension of the associated line pin 16. The ground pin 18 is electrically connected to an electrically conducting, substantially L-shaped ground contact 22 which extends along an axis of elongation of the chamber 13. When the spring 20 engages the contact 22, as will be discussed in greater detail hereinbelow, the associated line pin 16 is electrically connected to the ground pin 18, thereby shunting the circuit. This normally occurs in response to an over-current condition.

The assembly 11, illustrated in FIGS. 1 and 2, is located within the chamber 13 between the spring 20 and an innermost end 23 of the contact 22. The assembly 11 includes an electrically conducting hollow cup 24 having an open end 26 and a substantially planar closed end 28.

The interior of the cup 24 is of dimensions sufficient for accepting the remaining elements of the assembly 11, and the open end 26 allows for insertion of those elements into the cup 24 during construction of the assembly 11. The closed end 28 is intended to be in electrical circuit with the ground contact 22 so that over-voltage conditions can be shunted to ground, as will be discussed in detail hereinafter.

The assembly 11 includes means for isolating the arrester element 14 from the possibly harmful effects of externally applied forces. In the illustrated embodiment, this isolating means takes the form of a tube or sleeve 30 comprised of a high strength plastic which is inserted into the cup 24 through the open end 26. The sleeve 30 is substantially cylindrical in configuration and preferably is of such a diameter that its outer surface engages the cup 24 along an inner, substantially cylindrical surface thereof extending from the open end 26 to the closed end 28, as shown in FIG. 1.

The assembly 11 further includes the arrester element 14, an electrically conducting volute spring 32, and an electrically conducting contact 34, which extends outwardly of the cup 24 to form a contactor portion 33 for electrical contact with the spring 20, all disposed within the cup 24 and sleeve 30. As is evident from FIG. 1, the sleeve 30 has an axial length longer than the combined axial lengths of the arrester element 14, the spring 32 and at least a base portion 39 of the contact 34. Accordingly, when the sleeve 30, the element 14, the spring 32 and the contact 34 are properly disposed within the cup 24, an end 37 of the sleeve 30 adjacent the open end 26 of the cup 24 extends beyond a base portion 39 of the contact 34.

The sleeve 30 includes a substantially annular shoulder portion 41 adjacent the end 37. The shoulder portion 41 defines an enlarged inner diameter as compared with other portions of the sleeve 30, and also defines a seat 43, clearly visible in FIG. 2, engagable with the base portion 39 of the contact 34. Specifically, when the element 14, the spring 32, and the contact 34 are properly positioned within the sleeve 30 within the cup 24, the base 39 of the contact 34 rests on the seat 43. In this manner, axially directed forces applied to the contact 34 will be axially transmitted from the contact 34 to the sleeve 30, thereby isolating the element 14 from the effects of such forces. The sleeve 30 thusly acts for absorbing forces externally applied to the arrester 10, such as those encountered during the above-discussed drop impact test, so that those forces will not damage the arrester element 14. It is believed that the sleeve 30 acts like a column in axial compression during a drop impact, thereby absorbing the external, impact generated forces for insuring the structural integrity and proper functionality of the element 14. The presence of the sleeve 30 insures that the assembly 11, and therefore the arrester 10, will pass the drop impact test.

The arrester element 14 is preferably a substantially disk-shaped solid state thyristor which assists in shunting over-voltage conditions to ground. Specifically, the element 14 acts as a normally open switch having a predetermined breakdown voltage which, when reached, causes the switch to close, thereby allowing the over-voltage to be shunted to the ground contact 22. The arrester element 14 is placed within the cup 24 and the sleeve 30 against the inside of the closed end 28 opposite to the ground contact 22, as illustrated in FIG. 1. To offer further protection to the element 14, the sleeve 30 preferably includes a reduced inner diameter annular section 35 located surrounding the element 14 within the cup 24. This also helps to properly locate and generally center the element 14 within the cup 24 and the sleeve 30.

The volute spring 32 is also inserted into the cup 24 and the sleeve 30 so that one end thereof contacts a side of the element 14 opposite to the side thereof contacting the closed end 28. The spring 32 is substantially similar to, but can be dimensionally smaller than the volute spring disclosed in the above-referenced co-pending patent application. The contact 34 is then inserted into the cup 24 and the sleeve 30 such that the contact 34 contacts a side of the spring 32 opposite to the side thereof contacted by the element 14. Accordingly, the spring 32 is located between the element 14 and the contact 34. The portion 33 of the contact 34 extends beyond the open end 26 of the cup 24 for contacting the spring 20 as illustrated in FIG. 1.

In order to maintain the element 14, the spring 32 and the contact 34 within the sleeve 30 and the cup 24, the open end 26 of the cup 24, as well as adjacent portions of the sleeve 30, are deformed or bent radially inwardly, by appropriate means, along radii of the cup 24 and the sleeve 30, respectively, to form a seal 36 around the contact 34. This sealing of the assembly 11 can prolong the service life of the assembly 11 because it will be further protected from the possibly harmful effects of an ambient environment. Additionally, formation of the seal 36 facilitates force transfer from the contact 34 to the sleeve 30 by maintaining the contact 34 in engagement with the shoulder 41 and the seat 43.

Also, because the seal 36 maintains a slight compression of the spring 32, the spring 32 further acts as cushioning means for isolating the element 14 from the effects of externally applied forces. The cooperative properties of the sleeve 30 and the spring 32 minimize the probability that the element 14 will be damaged due to the effects of externally applied forces, such as those generated by a drop impact. Thusly, the arrester 10 and the assembly 11 can meet the above-discussed industry drop impact test.

In the embodiment illustrated in FIG. 1, the arrester 10 also includes fail-safe over-current condition protection means in the form of a solder pellet 38. The solder pellet 38 is located between the ground contact 22 and the closed end 28 of the cup 24. The pellet 38 is compressed between the contact 22 and the closed end 28 by compression of the spring 20 between the contact 34 and a base 40 of the module 12, as shown in FIG. 1. When an over-current condition is encountered, heat builds up in the module 12, and is conducted to the element 14 and the cup 24. This heat is transferred to the pellet 38 which melts, thereby allowing the spring 20 to expand until a contacting surface portion 42 on the spring 20 electrically contacts a corresponding contacting surface portion 44 on the ground contact 22. Thus, the circuit is shunted to ground.

Figure 5:
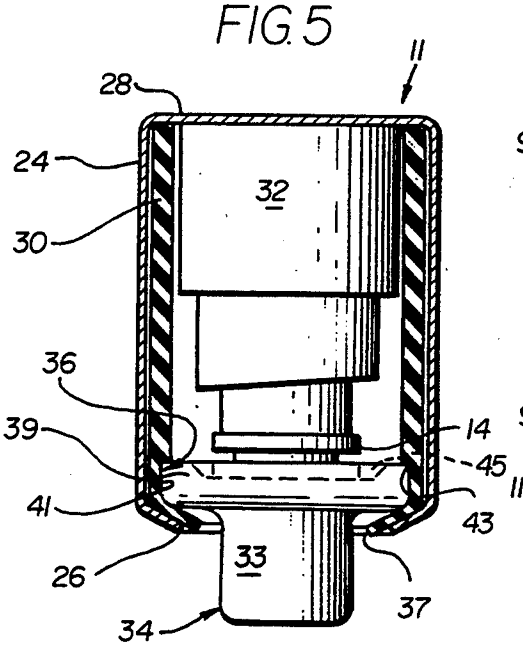
FIG. 5 is a partially sectioned side elevational view of another embodiment of the cup-arrester assembly of the invention, substantially similar to the embodiment shown in FIGS. 1 and 2, but having a reversed orientation of the spring and the arrester element.

While the assembly 11 is illustrated and has been discussed hereinabove with respect to particular relative dispositions of the elements thereof, it is to be clearly understood that the elements can be disposed in a number of different ways without departing from the intended scope of the invention. For instance, the contact 34 can be provided with a depression 45, shown in phantom lines in FIG. 1, for positioning the element 14, and the volute spring 32 can be accordingly located and compressed between the element 14 and the closed end 28 of the cup 24. This particular element/spring orientation is illustrated in FIG. 5. The functionality of the assembly 11 is not affected by the relative dispositions of the elements within the cup 24.

The invention is shown in connection with a different protector assembly, namely a screw-in type arrester 46 of FIG. 3. In this application, the assembly 11 is the same as discussed above. Thus, the same reference characters are used to indicate like elements of the assembly 11. The arrester 46 has a screw-in housing or module 48 substantially similar to the module disclosed in the above-referenced co-pending application. Thus, the assembly 11 can be effectively utilized with many types of arrester housing or module without departing from the scope of the invention.

Notably, the arrester 46 includes fail-safe over-current condition protection means in the form of a solder pellet 50 engaging a side of the closed end 28 of cup 24 opposite to the side thereof engaged by the element 14. The pellet 50 functions in the same manner as the pellet 38 of FIG. 1. However, the arrester 46 further includes an electrically conducting grounding cage 52 engaging a side of the pellet 50 opposite to the side thereof engaged by the closed end 28. The contact 34 electrically connects to a line contact 53 when the arrester 46 is properly screwed in. The cage 52 electrically contacts and surrounds the cup 24 and also electrically contacts the housing 48. The cage 52 is intended to shift axially with respect to the cup 24 for completing an electrical connection from a ground contact 54 through the housing 48 and cage 52 to the line contact 53 for shunting a circuit during an over-current condition of sufficient magnitude and duration to cause the pellet 50 to melt. A cylindrically coiled, electrically conducting spring 56 is provided for facilitating the above-described axial shifting of the cage 52 and for enhancing electrical contact with the housing 48 in an over-voltage condition, thereby allowing current to flow through the assembly 11, the cage 52 and the housing 48 to ground in well known fashion. Specifically, the spring 56 is located between the housing 48 and a side of the cage 42 opposite to a side thereof contacted by the pellet 50. During manufacture and/or installation of the arrester 46, the spring 56 is compressed between the housing 48 and the cage 52, thereby compressing the pellet 50 between the cup 24 and the cage 52. When the pellet 50 melts due to heat generation during an over-current condition, the spring 56 expands, thereby axially shifting the cage 52 into contact with the line contact 53 to shunt the line to ground.

Figure 4:
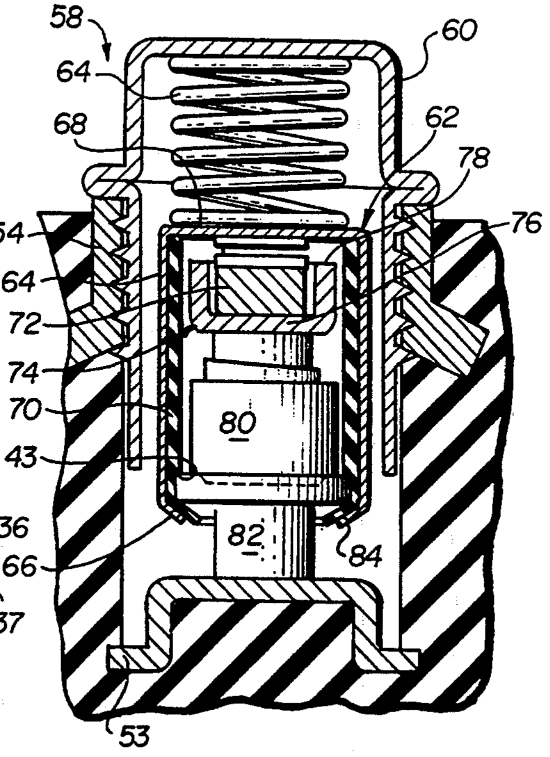
FIG. 4 is a view, similar to that of FIG. 4, of an alternative embodiment of the cup-arrester assembly including a solder pellet and a shunt cup.

Still another embodiment of the invention is an arrester module 58 shown in FIG. 4. The arrester 58 is of the screw-in type having a module housing 60 substantially similar to the housing 48. However, the arrester 58 includes a novel cup and arrester assembly 62 constructed somewhat differently from the cup and arrester assembly 11. Notably, the assembly 62 includes both the arrester element 14 and fail-safe over-current condition protection means within an sealed cup 64 substantially similar to the cup 24. Utilization of the assembly 62 makes the cage, described above, unnecessary and does not require an external solder pellet, as included in the above-discussed embodiments of the invention. This is advantageous in that it simplifies assembly as well as inventory control and handling of parts.

Specifically, the hollow cup 64 is electrically conducting having an open end 66 and a closed end 68, and is dimensioned for accepting the other elements of the assembly 62. The outside of the closed end 68 is engaged by a spring 69 which maintains the assembly 62 in proper disposition within the housing 60 and also serves to form a grounding contact between the cup 64 and the housing 60.

A substantially cylindrical cushion or sleeve 70, composed of a high strength plastic material, is inserted into the cup 64 through the open end 66 such that the sleeve 70 contacts a cylindrical inner surface of the cup 64 from the closed end 68 to the open end 66. The sleeve 70 functions substantially similarly to the sleeve 30 and insures that the arrester 58 can meet the industry drop impact test by isolating the element 14. It is to be noted that the sleeve 70 lacks the section 35 present on the sleeve 30, however, both sleeve configurations function equally well and can be utilized in any embodiment of the invention.

The solid state arrester element 14 is inserted into the cup 64 so that the arrester element 14 contacts a side of the closed end 68 opposite to the side thereof engaged by the spring 69. The fail-safe over-current condition protection means, in the form of an electrically conducting solder pellet 72 and an electrically conducting shunt cup 74, is placed on the arrester element 14 on a side thereof opposite to the side engaging the closed end 68. The solder pellet 72 can be dimensionally smaller than the pellets 38 and 50 and is disposed within the cup 64 in direct contact with the arrester element 14.

The shunt cup 74 is substantially bowl-shaped having a substantially planar portion 76 and a projecting annular flange portion 78. The planar portion 76 engages the solder pellet 72 on a side thereof opposite to the side engaging the arrester element 14. The flange portion 78 projects from the planar portion 76 a distance such that, when the pellet 72 melts in response to an over-current condition, the flange 78 will be able to engage the closed end 68 of the cup 64, thereby shunting across the arrester element 14.

A volute spring 80, substantially similar to the spring 32, is located in the cup 64 in contact with the planar portion 76 of the shunt cup 74 at a side thereof opposite to the side engaging the pellet 72. An opposite end of the spring 80 is contacted by a line contact 82, substantially similar to the line contact 34, and is compressed slightly between the contact 82 and the shunt cup 74. Thus, when the pellet 72 melts in response to an over-current condition, the line contact is shunted to ground through contact 82, spring 80, shunt cup 74, cup 64, spring 69, and housing 60 to the ground contact 54.

To maintain this assembly, the open end of the cup 64 and adjacent portions of the sleeve 70 are deformed radially inwardly to create a seal 84, substantially similar to the seal 36. By sealing the assembly 62, the service life of the arrester 58 is enhanced because the interior of the cup 74 will be better protected from the ambient environment.

Because the assembly 62 is self-contained, fewer parts and fewer production steps are required to manufacture the arrester 58. Specifically, the cage 52 and the external solder pellet 50, shown in FIG. 3, are eliminated, thereby increasing the ease of handling the arrester 58. Because only a single part, namely the completed assembly 62, need be inventoried as compared to the multiple parts, viz. a cup, a spring, a solder pellet, and a cage, comprising the arresters of the prior art, the assembly 62 facilitates efficient inventory monitoring and maintenance, as well as simplifying assembly of the screw-in type arrester 58.

Figure 6:
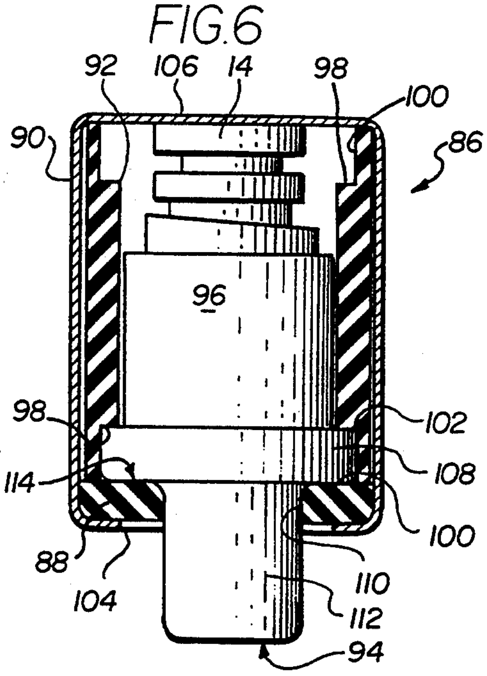
FIG. 6 is a partially sectioned side elevational view of yet another embodiment of the cup-arrester assembly of the invention including a contact gasket.

Yet a further embodiment of the invention is illustrated in FIG. 6, viz. a cup-arrester assembly 86. The assembly 86 is substantially similar to the assemblies illustrated in FIGS. 1 through 3, however, the assembly 86 further includes a contact gasket 88 for further isolating an arrester element 14 from the effects of external forces and for environmentally sealing the assembly 86 from the possibly adverse effects of an ambient environment.

In addition to the element 14 and the gasket 88, the assembly 86 comprises a cup 90, a sleeve 92 for isolating the element 14, which functions substantially similarly to the sleeves 30 and 70, a contact 94 and a volute spring 96, substantially similar to the springs 32 and 80. While the sleeve 92 functions as the sleeves 30 and 70 do, the sleeve 92 is constructed differently. Specifically, the sleeve 92 includes a shoulder portion 98 and increased inner diameter portions 100 on each of opposite ends thereof. This permits assembly of the sleeve 92 with the cup 90 in either orientation.

To construct the assembly 86, the sleeve 92 is inserted into the cup 90 through the open end 104 thereof so that it butts against the closed end 106 of the cup 90. The element 14 is inserted into the cup 90 and the sleeve 92 such that the element 14 lies against the closed end 106, as illustrated in FIG. 5. The volute spring 96 is placed within the cup 90 and the sleeve 92 so that an end of the spring 96 contacts a side of the element 14 opposite to the side thereof contacted by the closed end 106.

The contact 94, substantially similar to the contacts 34 and 82, is inserted into the cup 90 and the sleeve 92 such that a base portion 108 of the contact 94 engages the facing shoulder portion 98 on the sleeve 92. It is to be noted that the sleeve 92 is of an axial length such that the distal end thereof terminates at a juncture between the base portion 108 and a projecting portion 112 of the contact 94. Thus, the sleeve 92 is not deformed around the contact 94 to create a seal, as distinguished from the other embodiments of the invention.

The gasket 88 is now applied to the contact 94. More specifically, the gasket 88 is substantially flat and annular or washer-shaped, having a central hole 110 therethrough of dimensions sufficient to accept the projecting portion 112 of the contact 94, as shown in FIG. 5. The gasket 88 also butts up against the distal end of the sleeve 92 and the base portion 108 of the contact 94. Once the gasket 88 is applied, the spring 96 is compressed to the desired degree. To complete the assembly 86, the open end 104 of the cup 90 is deformed substantially radially inwardly over the gasket 88 thereby clamping the gasket 88 against the sleeve 92 and the contact 94 thereby forming a seal 114. In this manner, the gasket 88 environmentally seals the assembly 86, while also facilitating axial force transfer to the sleeve 92, thereby facilitating isolation of the arrester element 14 from the effects of externally applied forces.

As is evident from the foregoing discussion, the self-contained assemblies 11, 62 and 86 can be effectively utilized in a number of different arrester constructions without departing from the invention. Also, because arrester elements 14 are contained within the assemblies 11 and 62, which isolate those elements from the possibly harmful effects of externally applied forces, arresters including the assemblies 11 and 62 will meet the relevant industry drop impact tests.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An arrester assembly for isolating an arrester element from the effects of external forces applied to the arrester assembly, said assembly comprising: a cup; said arrester element having a given axial height and being located within the cup; a tubular sleeve of greater axial height than said arrester element disposed within the cup and surrounding the arrester element; an electrical contact disposed partially within and extending externally of the cup; said sleeve having a seat constructed and located for engagement with the contact so that forces applied to the contact are axially transmitted to and absorbed by said sleeve; and a compressible spring disposed in said cup for causing electrical conduction between the arrester element and the electrical contact, thereby isolating said arrester element from the effects of external axial compressive forces applied to the arrester assembly.

2. An arrester assembly according to claim 1 wherein the uncompressed height of said compressible spring is slightly greater than the difference between the axial height of the arrester and the axial height of the tubular sleeve.

3. An arrester assembly as defined in claim 1 wherein the seat of the sleeve includes a reduced inner diameter section located proximate to the arrester element.

4. An arrester assembly as defined in claim 1 wherein the spring has a volute configuration.

5. An arrester assembly as defined in claim 1 further comprising over-current condition protection means disposed in the cup.

6. An arrester assembly as defined in claim 5 wherein the over-current condition protection means is located between the arrester element and the compressible spring.

7. An arrester assembly as defined in claim 5 wherein the over-current condition protection means comprises a solder pellet meltable in response to an over-current condition and a shunting element for electrically shunting the arrester element responsive to melting of the pellet.

8. An arrester assembly as defined in claim 7 wherein the solder pellet is located between the arrester element and the shunting element.

9. An arrester assembly according to claim 8 wherein the compressible spring has an uncompressed axial height slightly greater than the difference between the axial height of the tubular sleeve and the combined on-axis axial heights of the arrester element, the solder pellet and the shunting element.

10. An arrester assembly as defined in claim 1 and further comprising sealing means for sealing the arrester element, the tubular sleeve and the compressible spring within the cup.

11. An arrester assembly as defined in claim 10 wherein the cup has an open end; said contact covering the open end; and the sealing means comprising a portion of the cup about said open end and a portion of the tubular sleeve respectively deformed around a peripheral surface of the contact.

12. An arrester assembly as defined in claim 10 wherein the cup has an open end; said contact covering the open end; said sealing means comprising a gasket disposed over the contact and portions of the open end and the tubular sleeve deformed around the gasket.

* * * * *